(12) United States Patent
Bogert et al.

(10) Patent No.: US 7,041,193 B2
(45) Date of Patent: May 9, 2006

(54) METHOD OF ADHERING MEMBERS AND AN ASSEMBLY FORMED THEREBY

(75) Inventors: Ronald Bogert, Brown City, MI (US); Christopher Hable, Romeo, MI (US)

(73) Assignee: L & L Products, Inc., Romeo, MI (US)

( * ) Notice: Subject to any disclaimer, the term of this patent is extended or adjusted under 35 U.S.C. 154(b) by 245 days.

(21) Appl. No.: 10/685,221

(22) Filed: Oct. 14, 2003

(65) Prior Publication Data

US 2004/0112531 A1    Jun. 17, 2004

Related U.S. Application Data

(60) Provisional application No. 60/470,511, filed on May 14, 2003.

(51) Int. Cl.
*C09J 5/00* (2006.01)
(52) U.S. Cl. .............................. 156/307.3; 156/307.7; 296/146.6; 29/897.2
(58) Field of Classification Search .................. 156/71, 156/274.8, 275.3, 307.3; 296/146.6; 29/897.2; 248/74.1, 74.4, 205.3
See application file for complete search history.

(56) References Cited

U.S. PATENT DOCUMENTS

| | | | |
|---|---|---|---|
| 3,400,182 A | 9/1968 | Kolt | |
| 3,868,796 A | 3/1975 | Bush | |
| 4,399,174 A | 8/1983 | Tanaka et al. | |
| 4,451,518 A | 5/1984 | Miura et al. | |
| 4,463,870 A | 8/1984 | Coburn, Jr. et al. | |
| 4,610,836 A | 9/1986 | Wycech | |
| 4,751,249 A | 6/1988 | Wycech | |
| 4,769,391 A | 9/1988 | Wycech | |
| 4,769,951 A | 9/1988 | Kaaden | |
| 4,813,690 A | 3/1989 | Coburn, Jr. | |
| 4,836,516 A | 6/1989 | Wycech | |
| 4,853,270 A | 8/1989 | Wycech | |
| 4,861,097 A | 8/1989 | Wycech | |
| 4,923,902 A | 5/1990 | Wycech | |
| 4,950,348 A * | 8/1990 | Larsen | 156/275.3 |
| 4,978,562 A | 12/1990 | Wycech | |
| 5,124,186 A | 6/1992 | Wycech | |
| 5,266,133 A | 11/1993 | Hanley et al. | |
| 5,344,208 A | 9/1994 | Bien et al. | |
| 5,358,397 A | 10/1994 | Ligon et al. | |
| 5,506,025 A | 4/1996 | Otto et al. | |

(Continued)

FOREIGN PATENT DOCUMENTS

DE    198 12 288 C1    5/1999

(Continued)

OTHER PUBLICATIONS

Copending U.S. Appl. No. 09/631,211, filed Aug. 3, 2000.

(Continued)

*Primary Examiner*—Jeff H. Aftergut
*Assistant Examiner*—John L. Goff
(74) *Attorney, Agent, or Firm*—Dobrusin & Thennisch PC

(57) ABSTRACT

The method of adhering members includes positioning of an adhesive material between an attachment surface of a first member (e.g., a door beam) and a second member (e.g., a bracket). Thereafter, the adhesive material is at least partially cured to adhere the material to the attachment surface to form an assembly and the assembly is assembled to an article of manufacture (e.g., an automotive vehicle).

26 Claims, 3 Drawing Sheets

U.S. PATENT DOCUMENTS

| | | | |
|---|---|---|---|
| 5,544,930 A | 8/1996 | Stedman | |
| 5,547,152 A * | 8/1996 | Krock | 248/74.1 |
| 5,553,910 A | 9/1996 | Park | |
| 5,575,526 A | 11/1996 | Wycech | |
| 5,577,784 A | 11/1996 | Nelson | |
| 5,580,119 A * | 12/1996 | Uchida et al. | 296/146.6 |
| 5,707,098 A | 1/1998 | Uchida et al. | |
| 5,755,486 A | 5/1998 | Wycech | |
| 5,766,719 A | 6/1998 | Rimkus | |
| 5,804,608 A | 9/1998 | Nakazato et al. | |
| 5,888,600 A | 3/1999 | Wycech | |
| 5,932,680 A | 8/1999 | Heider | |
| 5,985,435 A | 11/1999 | Czaplicki et al. | |
| 5,992,923 A | 11/1999 | Wycech | |
| 5,997,077 A | 12/1999 | Siebels et al. | |
| 6,003,274 A | 12/1999 | Wycech | |
| 6,006,484 A | 12/1999 | Geissbuhler | |
| 6,033,300 A | 3/2000 | Schneider | |
| 6,068,424 A | 5/2000 | Wycech | |
| 6,079,180 A | 6/2000 | Wycech | |
| 6,092,864 A | 7/2000 | Wycech et al. | |
| 6,096,403 A | 8/2000 | Wycech et al. | |
| 6,099,948 A | 8/2000 | Paver, Jr. | |
| 6,103,341 A | 8/2000 | Barz et al. | |
| 6,129,410 A | 10/2000 | Kosaraju et al. | |
| 6,131,897 A | 10/2000 | Barz et al. | |
| 6,135,541 A | 10/2000 | Geise et al. | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche | |
| 6,197,403 B1 | 3/2001 | Brown et al. | |
| 6,199,940 B1 | 3/2001 | Hopton et al. | |
| 6,207,244 B1 | 3/2001 | Moellerplast | |
| 6,233,826 B1 | 5/2001 | Wycech | |
| 6,237,304 B1 | 5/2001 | Wycech | |
| 6,253,524 B1 | 7/2001 | Hopton et al. | |
| 6,253,819 B1 | 7/2001 | Frendle et al. | |
| 6,263,635 B1 | 7/2001 | Czaplicki | |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,422,575 B1 | 7/2002 | Czaplicki et al. | |
| H2047 H | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B1 | 11/2002 | Barz | |
| 6,474,723 B1 | 11/2002 | Czaplicki et al. | |
| 6,475,577 B1 | 11/2002 | Hopton et al. | |
| 6,482,486 B1 | 11/2002 | Czaplicki et al. | |
| 6,482,496 B1 | 11/2002 | Wycech | |
| 6,502,821 B1 | 1/2003 | Schneider | |
| 6,519,854 B1 | 2/2003 | Blank | |
| 6,523,857 B1 | 2/2003 | Hopton et al. | |
| 6,523,884 B1 | 2/2003 | Czaplicki et al. | |
| 6,546,693 B1 | 4/2003 | Wycech | |
| 6,561,571 B1 | 5/2003 | Brennecke | |
| 6,573,309 B1 | 6/2003 | Reitenbach et al. | |
| 6,575,526 B1 | 6/2003 | Czaplicki et al. | |
| 6,607,238 B1 | 8/2003 | Barz | |
| 6,619,727 B1 | 9/2003 | Barz et al. | |
| 6,634,698 B1 | 10/2003 | Kleino | |
| 6,641,208 B1 | 11/2003 | Czaplicki et al. | |
| 6,668,457 B1 | 12/2003 | Czaplicki | |
| 6,679,540 B1 | 1/2004 | Graber et al. | |
| 6,692,347 B1 | 2/2004 | Schneider | |
| 6,706,222 B1 | 3/2004 | Gallagher et al. | |
| 6,729,425 B1 | 5/2004 | Schneider | |
| 6,855,652 B1 | 2/2005 | Hable et al. | |
| 6,887,914 B1 | 5/2005 | Czaplicki et al. | |
| 6,932,421 B1 | 8/2005 | Barz | |
| 2002/0053179 A1 | 5/2002 | Wycech | |
| 2002/0074827 A1 | 6/2002 | Fitzgerald et al. | |
| 2002/0160130 A1 | 10/2002 | Sheldon et al. | |
| 2002/0174954 A1 | 11/2002 | Busseuil et al. | |
| 2003/0001469 A1 | 1/2003 | Hankins et al. | |
| 2003/0039792 A1 | 2/2003 | Hable et al. | |
| 2003/0042056 A1 | 3/2003 | Schneider et al. | |
| 2003/0050352 A1 | 3/2003 | Guenther et al. | |
| 2003/0057737 A1 | 3/2003 | Bock et al. | |
| 2003/0062739 A1 | 4/2003 | Bock | |
| 2003/0069335 A1 | 4/2003 | Czaplicki et al. | |
| 2003/0090129 A1 | 5/2003 | Riley et al. | |
| 2003/0140671 A1 | 7/2003 | Lande et al. | |
| 2003/0144409 A1 | 7/2003 | Kassa et al. | |
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0186049 A1 | 10/2003 | Czaplicki et al. | |
| 2003/0201572 A1 | 10/2003 | Coon et al. | |
| 2003/0218019 A1 | 11/2003 | Le Gall et al. | |
| 2004/0011282 A1 | 1/2004 | Myers et al. | |
| 2004/0018341 A1 | 1/2004 | Richardson et al. | |
| 2004/0018353 A1 | 1/2004 | Czaplicki et al. | |
| 2004/0031164 A1 | 2/2004 | Sevastian | |
| 2004/0033344 A1 | 2/2004 | Czaplicki et al. | |
| 2004/0034982 A1 | 2/2004 | Wieber et al. | |
| 2004/0046423 A1 | 3/2004 | Wieber | |
| 2004/0051251 A1 | 3/2004 | Hankins et al. | |
| 2004/0056472 A1 | 3/2004 | Schneider | |
| 2004/0074150 A1 | 4/2004 | Wycech | |
| 2004/0075299 A1 | 4/2004 | Wieber et al. | |
| 2004/0076831 A1 | 4/2004 | Hable | |
| 2004/0079478 A1 | 4/2004 | Merz | |
| 2004/0195817 A1 | 10/2004 | Tarbutton et al. | |
| 2005/0166532 A1 | 8/2005 | Barz | |

FOREIGN PATENT DOCUMENTS

| | | |
|---|---|---|
| DE | 198 56 255 C1 | 1/2000 |
| DE | 198 58 903 A1 | 6/2000 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 1 122 156 A2 | 8/2001 |
| EP | 0 893 332 B1 | 3/2002 |
| EP | 1 362 683 A2 | 11/2003 |
| EP | 1 362 769 A1 | 11/2003 |
| FR | 2 749 263 | 12/1997 |
| GB | 2 375 328 A | 11/2002 |

| | | | |
|---|---|---|---|
| JP | 4-300715 A | 10/1992 | |
| JP | 4-300716 A | 10/1992 | |
| JP | 5-38992 | 2/1993 | |
| WO | WO 95/32110 | 11/1995 | |
| WO | WO 97/02967 | 1/1997 | |
| WO | WO 97/43501 | 11/1997 | |
| WO | WO 98/50221 | 11/1998 | |
| WO | WO 99/08854 | 2/1999 | |
| WO | WO 99/17947 | * | 4/1999 |
| WO | WO 99/28575 | 6/1999 | |
| WO | WO 99/48746 | 9/1999 | |
| WO | WO 99/50057 | 10/1999 | |
| WO | WO 99/61216 | 12/1999 | |
| WO | WO 00/13958 | 3/2000 | |
| WO | WO 00/17000 | 3/2000 | |
| WO | WO 00/27920 | 5/2000 | |
| WO | WO 00/37302 | 6/2000 | |
| WO | WO 00/40815 | 7/2000 | |
| WO | WO 00/43254 | 7/2000 | |
| WO | WO 00/46461 | 8/2000 | |
| WO | WO 00/55444 | 9/2000 | |
| WO | WO 01/54936 A1 | 8/2001 | |
| WO | WO 01/71225 A1 | 9/2001 | |
| WO | WO 01/83206 A1 | 11/2001 | |
| WO | WO 01/88033 A1 | 11/2001 | |
| WO | WO 03/042024 A1 | 5/2003 | |
| WO | WO 03/078163 A1 | 9/2003 | |

OTHER PUBLICATIONS

Copending U.S. Appl. No. 10/646,439, filed Aug. 21, 2003.
Copending U.K. Application Serial No. 0220945.0 filed Sep. 10, 2002.
Copending U.S. Appl. No. 10/686,845, filed Oct. 16, 2003.
Copending U.K. Application Serial No. 0300159.1 filed Jan. 6, 2003.
Copending U.S. Appl. No. 10/712,069, filed Nov. 13, 2003.
Copending U.S. Appl. No. 10/783,326, filed Feb. 20, 2004.
Copending U.S. Appl. No. 10/822,406, filed Apr. 12, 2004.
Copending U.S. Appl. No. 10/430,993, filed May 7, 2003.
Copending U.K. Application Serial No. 0310524.4 filed May 8, 2003.
International Search Report dated Oct. 28, 2004. PCT/US04/013037. (1001.113WO).

* cited by examiner

US 7,041,193 B2

METHOD OF ADHERING MEMBERS AND AN ASSEMBLY FORMED THEREBY

CLAIM OF BENEFIT OF FILING DATE

The present application claims the benefit of the filing date of U.S. Provisional Application Ser. No. 60/470,511, filed May 14, 2003, hereby incorporated by reference.

FIELD OF THE INVENTION

The present invention relates generally to a method of adhering a first member to a second member and an assembly formed thereby. More particularly, the present invention relates to a method of adhering at least one structural reinforcement member to another member with a structural adhesive material to form a reinforcement assembly.

BACKGROUND OF THE INVENTION

For many years, industry has been adhering members together for a wide variety of applications. As one example, members may be adhered together to form a reinforcement assembly for an article of manufacture such as an automotive vehicle. Current methods of adhering members together, however, suffer from a variety of drawbacks.

As one example, adhesives require significant cure times to adequately adhere one member to another member such that movement (e.g., transportation) of the members does not undesirably alter the orientation of one member relative to another. As a result, these adhesive curing times can add significant time delays for assembly of articles of manufacture.

Therefore, the present invention provides an adhesion process, which overcome the aforementioned exemplary drawback or other drawbacks related to the adhering of members together.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
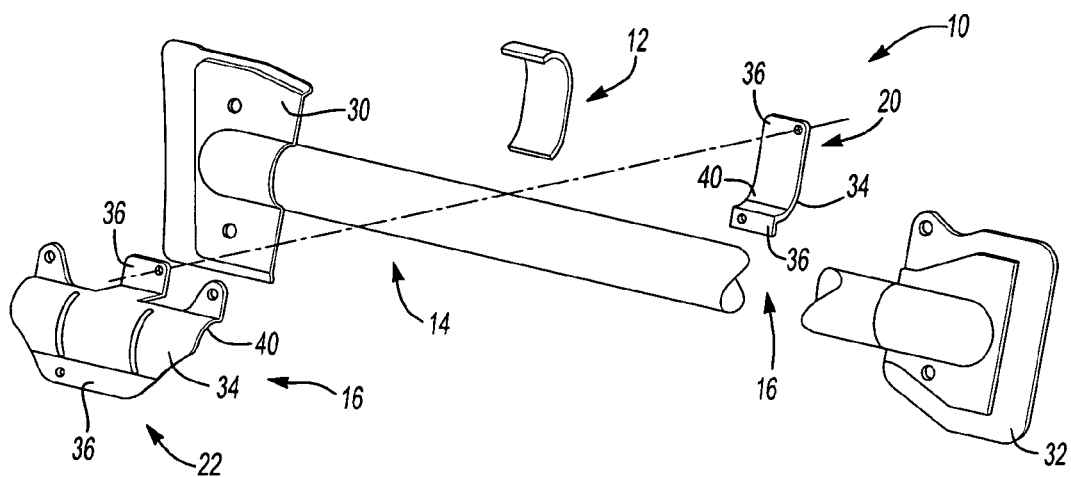
FIG. 1 is a blown up perspective view of an assembly that may be formed according to an aspect of the present invention.

The present invention is predicated upon providing an improved method of adhering a first member to a second member to form an assembly for an article of manufacture. The method has found particular utility for forming a reinforcement assembly for an automotive vehicle although it is contemplated that the method may be applied to form a variety of assemblies for a variety of articles of manufacture such as airplanes, boats, buildings, furniture or the like.

Accordingly, the method of the present invention typically includes one or more of the following steps:
1) positioning an adhesive material between a surface of a first member and a surface of a second member;
2) at least partially curing the adhesive material to attach the first member to the second member thereby forming an assembly;
3) transporting the assembly from a first location to a second location; and
4) further curing the adhesive material.

Referring to FIGS. 1 through 7, there is illustrated one exemplary embodiment of an assembly 10 being formed in accordance with the present invention. The assembly 10 is provided for purposes of illustration of the present invention. It is contemplated that alternative assemblies may be formed in accordance with the teachings of the present disclosure. Some of those alternative assemblies are disclosed below, however, the skilled artisan will appreciate that many other alternatives may also be employed in the practice of the present invention.

The assembly 10 includes a first member 14 being attached to a second member 16 with an adhesive material 12. The first member 14 is shown for illustrative purposes as a reinforcement beam for reinforcing a component of an automotive vehicle such as a vehicle door. The second member 16 is illustratively shown as a bracket that is composed a first structure 20 and a second structure 22.

The first member 14 includes an elongated member 28 (e.g., a cylindrical pipe) extending between a first attachment 30 and a second attachment 32 (e.g., a first and second bracket). Both structures 20, 22 of the second member 16 include an arcuate portion 34 with a pair of flanges 36 extending therefrom. Preferably, both the first member 14 and the second member 16 respectively provide attachment surfaces 38, 40 suitable for adhesion.

While the first member 14 and second member 16 are respectively illustrated as a reinforcement beam and a bracket, it is contemplated that the first member may be formed in a variety of configurations depending upon its intended application within an article of manufacture. Within automotive applications, for example, the members may be frame members, body members or panels, reinforcing members, pillars, bumpers, closure panels, combinations thereof or the like. As another example, the method may be used to attach a fastener such as a clip to a member such as a beam.

In the embodiment shown, the first member 14 and the second member 16 including the first attachment 30 the second attachment 32, and both structures 20, 22 are preferably formed of metal (e.g., steel, aluminum, magnesium, iron, combinations thereof or the like). It is contemplated, however, that the members 14, 16 and their respective components may be formed of polymeric materials, plastics or other materials.

The adhesive material 12 is shown as a rectangular strip, although it is possible to shape the adhesive material 12 into nearly any desired configuration, which may be continuous or non-continuous. Moreover, it is possible that the adhesive material may be pumped into repeated similar configuration or varying configurations. Preferably, the adhesive material 12 is a structural material that exhibits high strength to weight under stress conditions.

One preferred structural adhesive material suitable for use in the present invention is disclosed in copending U.S. patent application Ser. No. 10/386,287, filed Mar. 11, 2003 and titled, "Activatable Material", and is expressly incorporated herein by reference for all purposes. Accordingly, this exemplary preferred structural material includes a mixture of epoxy resin (e.g., between about 20% and about 80% by weight) and an elastomer-containing adduct (e.g., between about 20% and about 80% by weight). It shall be understood, however, that the skilled artisan will be able to conceive of various alternative suitable adhesive materials within the scope of the present invention.

The adhesive material 12 may be activatable (e.g., activatable to expand, cure or both) and may be tacky or non-tacky prior to partial or full cure. For example, the adhesive material 12 may be heat expandable, but is preferably non-expandable or only slightly expandable (e.g. expandable to between about 100% and about 115% it pre-expanded size). Of course, greater amounts of expansion may be experienced as discussed herein. The adhesive material 12 may also be heat curable.

According to one preferred embodiment, the adhesive material includes a conductive filler that imparts conductivity to the material. Exemplary conductive fillers include, without limitation, carbon black, carbon fibers, metal coated fillers (e.g., metal coated carbon fibers), combinations thereof or the like. Other examples include metal containing material such as iron phosphides, oxides such as tin oxide (e.g., which may be antimony doped), metal coated glass spheres, graphite, combinations thereof or the like. Preferably, when included, the conductive filler composes about 1% to about 30% by weight, more preferably 5% to about 20% by weight and even more preferably 7% to about 13% by weight of the expandable material.

Preferably, the adhesive material has flowable or foamable characteristics, although not required. The material may be generally dry to the touch or tacky and can be placed intermediate the members 14, 16 in any form of desired pattern, placement, or thickness, but is preferably a substantially uniform thickness. One exemplary material is L-5020 structural tape available through L&L Products, Inc. of Romeo, Mich.

Though other materials are certainly possible for the adhesive material, a preferred adhesive material is an expandable or non-expandable polymeric material (e.g., a plastic, a thermoset or the like). A particularly preferred material is an epoxy-based structural adhesive. For example, without limitation, the structural adhesive may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural materials are known in the art and may be used for the present invention. A typical foamed or unfoamed structural material includes a polymeric base material, such as an epoxy resin or ethylene-based polymer which, when compounded with appropriate ingredients (typically a curing agent and optionally a blowing agent), can soften, flow, expand, cure, a combination thereof or the like in a reliable and predictable manner upon the application of heat or the occurrence of a particular ambient condition. From a chemical standpoint, the structural adhesive material is usually initially processed as a flowable thermoplastic material before curing. It will cross-link upon curing, which makes the material incapable of further flow.

An example of a preferred formulation for the adhesive material is an epoxy-based material that is commercially available from L&L Products of Romeo, Mich., under the designations L5206, L5207, L5208, L5209, L5224, L5225, L5020, L5001, L8120. One advantage of the preferred adhesive materials over prior art materials is that the preferred materials can be processed in several ways. The preferred materials can be processed by injection molding, pumping, die-cutting (e.g., rotary die-cutting), extrusion, compression molding or with a mini-applicator. This enables the formation and creation of part designs that exceed the capability of most prior art materials.

While the preferred materials for fabricating the adhesive material have been disclosed, the material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, acrylic materials, phenolic materials, urethane materials, phenoxy materials, and polyurethane materials with high glass transition temperatures. See also, U.S. Pat. Nos. 5,766,719; 5,755,486; 5,575,526; 5,266,133; 5,575,526; 5,932,680; and WO 00/27920 (PCT/US 99/24795) (all of which are expressly incorporated by reference). In general, it is desirable for the expandable material to have good corrosion resistance properties. Preferably, the material will withstand the processing conditions typically encountered in the manufacture of a vehicle, such as the e-coat priming, cleaning and degreasing and other coating processes, as well as the painting operations encountered in final vehicle assembly.

In applications where the adhesive material is a heat activated material, an important consideration involved with the selection and formulation of the material comprising the adhesive is the temperature at which a material reaction or expansion, and possibly curing, will take place. For instance, in most applications, it is undesirable for the material to be reactive at room temperature or otherwise at the ambient temperature in a production line environment. More typically, the structural adhesive becomes reactive at higher processing temperatures, such as those encountered in an automobile assembly plant, when the material is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

In another embodiment, the adhesive material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen member or panel, and applying it thereto.

Prior to applying the adhesive material 12 to one or both of the members, it may optionally be desirable to treat one or more surfaces (e.g., the attachment surfaces 38, 40) of the members for increasing the suitability of the surfaces to adhesion. Exemplary treatments include, without limitation, exposure of the surfaces to radiation (e.g., infrared or UV radiation), a laser, plasma, combinations thereof or the like. Other exemplary treatments may include applying a primer or other coating to the surfaces. Still other treatments can include cleaning of the surfaces with solvents or other cleaners, wiping of the surfaces, a combination thereof or the like. It is also contemplated that treatments may participate (e.g., be chemically active) in bonding the adhesive material to the members such as by treating the members with a catalyst, a second adhesive material, a combination thereof or the like.

The adhesive material 12 may be applied to the first member 14, the second member 16 or both using a variety of techniques, which may be manual, semi-automatic or automatic, for forming the assembly 10 in accordance with the present invention. The adhesive material 12 may be applied to the first member 14 then the second member 16, the second member 16 then the first member 14 or simultaneously to both members 14, 16.

Figure 2:
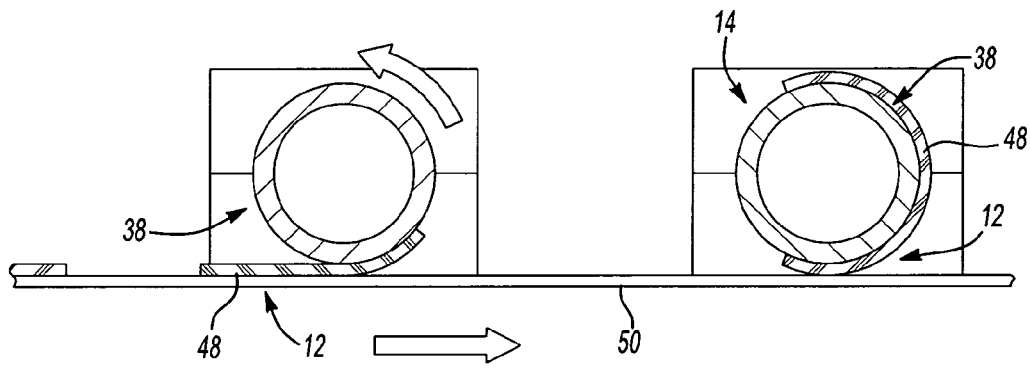
FIG. 2 illustrates a portion of a method of adhering members together according to an aspect of the present invention.

According to one preferred embodiment, and referring to FIG. 2, the adhesive material 12 is extruded in strips 48 onto a release material shown as a release tape or release liner 50. Preferably, the release liner 50 is provided as continuous for several strips of adhesive material, but may be provided as a separate piece or sheet for each strip. Thereafter, the release liner 50 is advanced adjacent to the first member 14 such that at least one strip 48 of the adhesive material 12 is released from the release liner 50 and applied to (e.g., contacted with) the attachment surface 38 of the first member 14. In the preferred embodiment, the first member 14 is moved (e.g., rotated) such that the strip 48 is substantially evenly applied to the attachment surface 38.

Both the movement of the first member 14 and the advancement of the liner 50 may be accomplished using various techniques, which may be manual, semi-automatic or automatic. In one example, the first member 14 is manually placed upon supports (not shown), which automatically rotate the first member 14 as the liner 50 is advanced. Moreover, the release liner 50 may be advanced on rolls (not shown).

The adhesive material 12 is also preferably applied to (e.g., contacted with) the attachment surface(s) 40 of the second member 16 to form the reinforcement assembly 10. In a preferred embodiment shown in FIG. 3, the first structure 20 and the second structure 22 are positioned about the first member 14 such that the flanges 36 of the structures 20, 22 are in substantially opposing relation to each other and such that the elongated member 28 of the first member 14 is received within cavities 56 formed by the arcuate portions 34 of the structures 20, 22. As shown, the arcuate portions 34 of the structures 20, 22 substantially surround the elongated member 28 thereby locating the adhesive material 12 between the attachment surfaces 38, 40 of the first and second members 14, 16.

Figure 3:
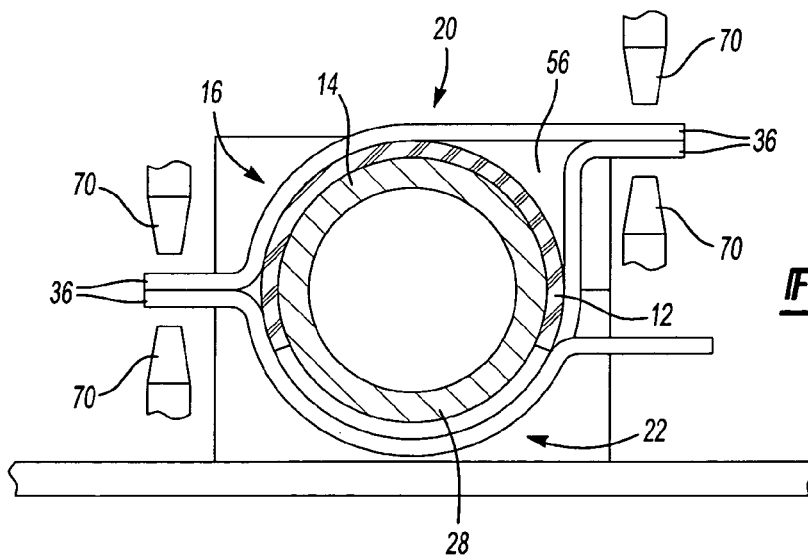
FIG. 3 illustrates another portion of a method of adhering members together according to an aspect of the present invention.
Figure 4:
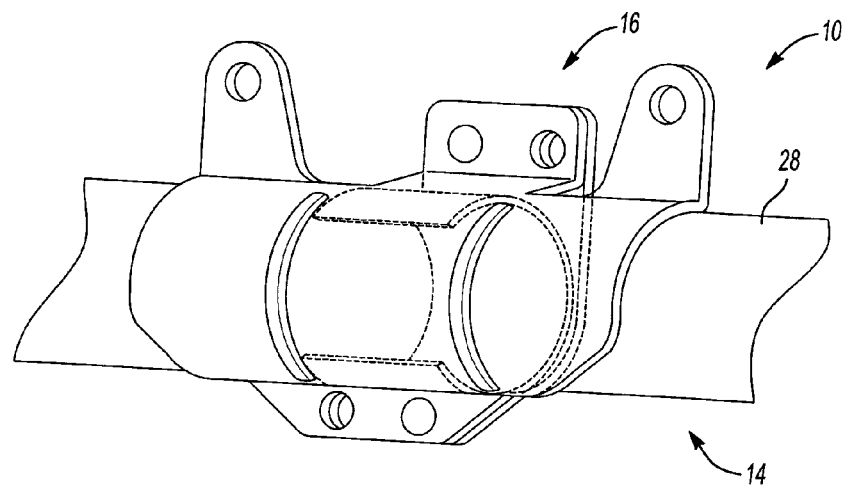
FIG. 4 illustrates an assembly formed in accordance with an aspect of the present invention.

In the preferred embodiment, the first structure 20 of the second member 16 is attached to the second structure 22 of the second member 16 during formation of the assembly 10. As shown in FIG. 3, the opposing flanges 36, are welded (e.g., spot-welded) to each other with electrodes 70. Preferably, for such welding, the first member 14, the second member 16 or both are held in place by supports, although not required.

While one specific preferred embodiment for applying the adhesive material 12 to the attachment surfaces 38, 40 of the members 14, 16 and forming the assembly 10 has been disclosed, it shall be appreciated that the skilled artisan will be able to imagine a variety of alternative application techniques within the scope of the present invention. As one example, the adhesive material may be extruded onto one or more of the attachment surface of the members with an extruder (e.g., a mini-applicator). As another example an individual may manually place the adhesive material in contact with one or more of the attachment surfaces. As another example, the adhesive material may be applied to an attachment surface of one member (e.g., the bracket or the pipe) with a strip of release material thereon and the release material may be removed (e.g., manually, mechanically or both) followed by contacting an attachment surface of the other member with the adhesive material.

Additionally, it is contemplated that alternatives to the discussed welding step may be employed. For example, and without limitation, the first structure 20 may be mechanically secured or interference fit to the second structure using mechanical fasteners such as snap-fits, rivets, screws, toggle locks, combinations thereof or the like. As other alternative examples, magnets or additional adhesives may be employed in place of welding. Moreover, it is contemplated that a multi-station assembly such as turntable may be employed during welding such that members may be loaded and unloaded from the multi-station assembly while members or structures of the members are being welded or otherwise secured together.

In other alternative embodiments, it is contemplated that the adhesive material 12 may be the only attachment of the second member 16 to the first member 14 such that welding or fastening mechanisms are unneeded. For example, in one embodiment, it is contemplated that only one of the structures 20, 22 illustrated or other structures may comprise the second member 14 and that second member may be secured to the first member 14 with only the adhesive material.

Once the adhesive material 12 has been applied to the attachment surfaces 38, 40 of the first member 14, the second member 16 or both, the adhesive material 12 undergoes an initial cure wherein the material 12 is at least partially cured to assist in securing the first member 14 to the second member 16. Preferably, the initial cure is a partial cure although it may be a full cure. A partial cure, as used herein, typically means between about 10% and about 99.5% cured, more typically between about 30% and about 97% cured and even more typically between about 50% and about 94% cured.

Depending upon the type of adhesive, various curing techniques may be used for performing the initial cure such as exposure to heat, exposure to chemicals (e.g., cross-linking agents), exposure to moisture, exposure to light or radiation (e.g., UV radiation), exposure to pressure, exposure to microwaves, combinations thereof or other techniques. Other possible techniques include a partial chemical cure followed by curing due to exposure to heat, employment of an encapsulated curing agent or other chemical followed by opening of the encapsulation by application of pressure or heat, employment of blocked curing agents, curing by heat induced by flowing electrical current through the adhesive material (e.g., during welding), combinations thereof or the like.

Figure 5:
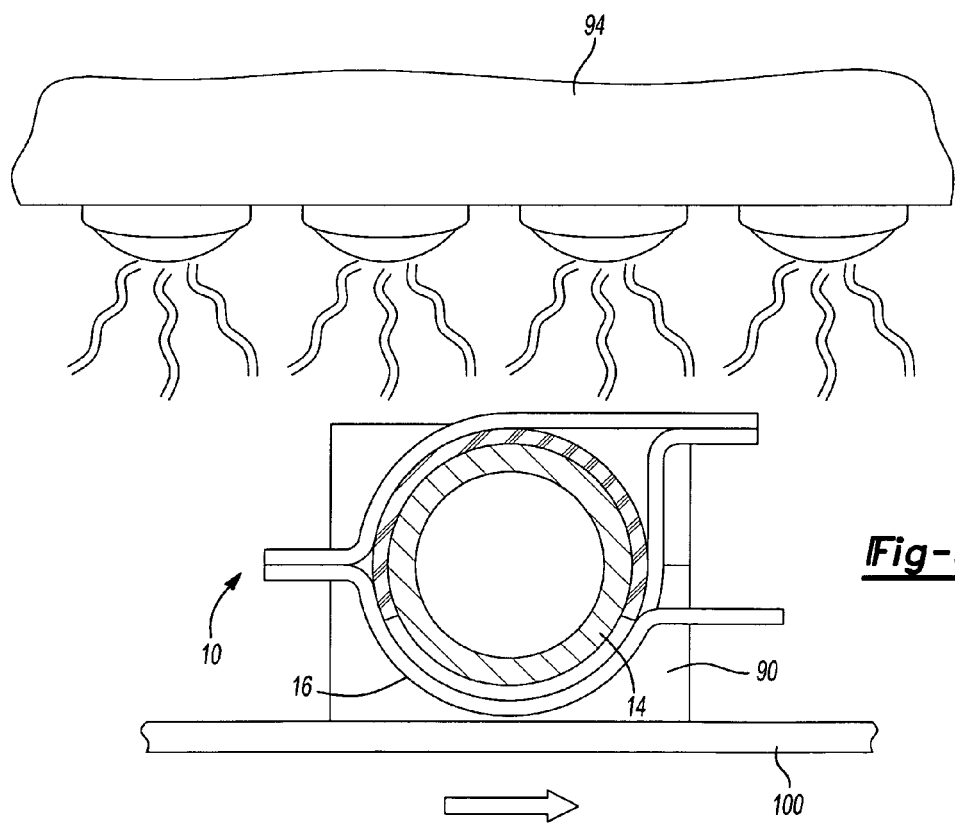
FIG. 5 illustrates another portion of a method of adhering members together according to an aspect of the present invention.
Figure 6:
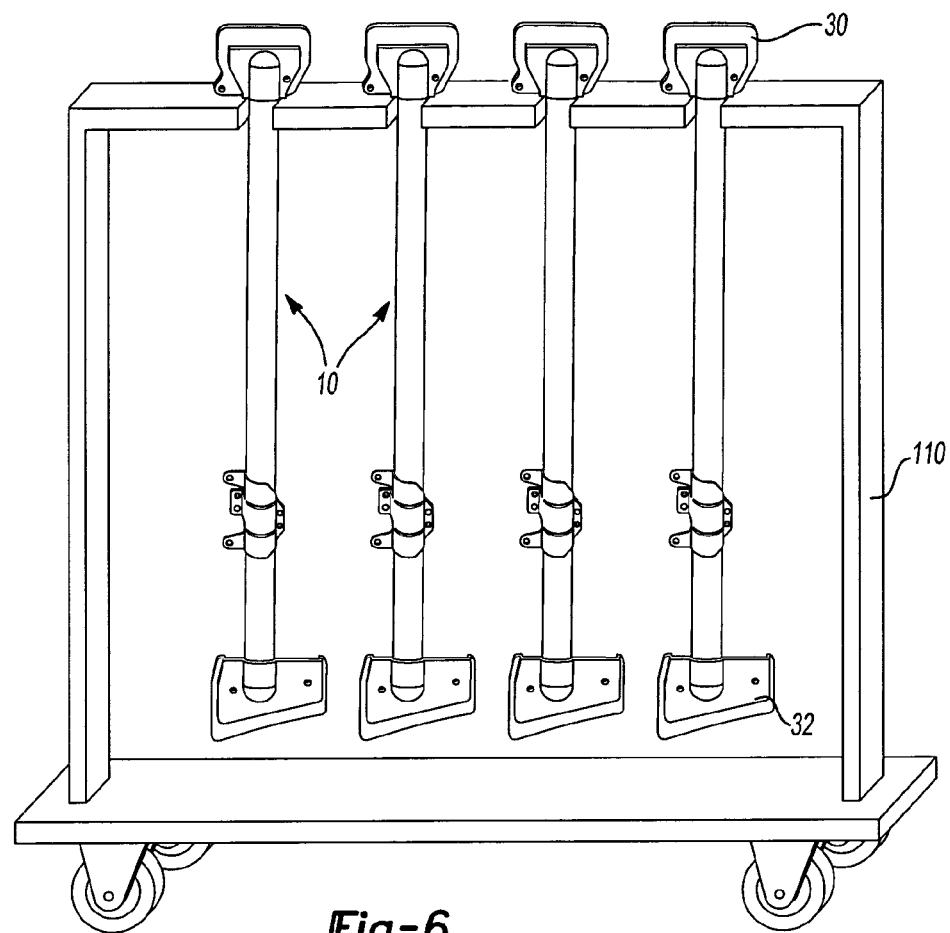
FIG. 6 illustrates another portion of a method of adhering members together according to an aspect of the present invention.

In FIG. 5, according to a preferred embodiment, the adhesive material 12 is exposed to infrared (IR) radiation for elevating a temperature of the adhesive material 12 to perform the initial cure. In the particular embodiment shown, the first member 14 of the assembly 10, the second member 16 of the assembly 10 or both are positioned upon one or more supports 90 for assisting in positioning the members 14, 16 relative to each other during initial cure.

As shown, at least a portion of the assembly 10 is exposed to a heat source 94 such that the temperature of the adhesive material 12 is elevated thereby at least partially curing the adhesive material 12. In turn, the curing of the adhesive material assists in securing the first member 14 to the second member 16. In the particular embodiment illustrated, the assembly 10 is advanced by a conveyor 100 while maintaining the adhesive material below an infrared elongated lamp as the heat source 94. As shown, only a localized portion of the assembly 10 adjacent the adhesive material 12 needs to be exposed.

Advantageously, heating of a localized portion of the assembly allows faster cooling of the assembly after exposure to heat source, particularly since the rest of the assembly can act as a heat sink to remove heat from the localized portion. However, it is contemplated within the scope of the present invention, that an entire assembly or group of entire assemblies may be heated, for example by placing them within a large oven or other heating structure.

Preferably, the heat source 94 is configured to produce a temperature about the adhesive material 12 of between about 200° F. and about 1000° F., more preferably between about 350° F. and about 750° F. and even more preferably between about 500° F. and about 600° F. Also preferable, the adhesive material 12 is exposed to the temperature for a time period of between about 1 and about 20 minutes, more preferably between about 3 and about 10 minutes and even more preferably between about 4 and about 6 minutes. During the time period, the adhesive is cured at least about 20% more preferably at least about 50% and even more preferably at least about 80% during the initial cure. Of course, the temperature for curing, time of curing and amount of curing can vary depending upon the cure system of any particular adhesive material used.

After the initial cure, the assembly 10 is typically transported from a first location adjacent the heat source 94 to a second location, which is suitable for attachment of the assembly 10 to an article of manufacture. For example, in the preferred embodiment, and referring to FIG. 6, the assembly 10 is placed upon a rack 110 for transportation (e.g., by motor vehicle) from a first manufacturing facility (e.g., an automotive vehicle parts supplier facility) suitable for forming the assembly to a second facility (e.g., an automotive vehicle assembly plant) suitable for assembling an article of manufacture to which the assembly 10 is applied.

As can be seen, the assembly 10 is supported by the rack 110 at the first end attachment 30 of the first member 14 such that the second end attachment 32 of the first member 14 hangs below the first end attachment 30. In turn, the structural adhesive material 12 is at least partially required to support the second member 16 by securing the second member 16 to the first member 14. In the particular embodiment shown, the first and second members 14, 16 do not contact each other and only the adhesive material 12 contacts both the first and second member 14, 16. Thus, the adhesive material 12 provides the only link between the first and second members 14, 16 and is therefore primarily responsible for supporting the second member 16 relative to the first member 14.

Advantageously, the adhesive material 12 is secured to the first member 14 and the second member 16 with greater integrity due to the initial cure. As such, the first member 14 and second member 16 are less likely to move relative to each other during transportation of the assembly 10. Thus, the second member 16 is well supported by the adhesive material 12.

Figure 7:
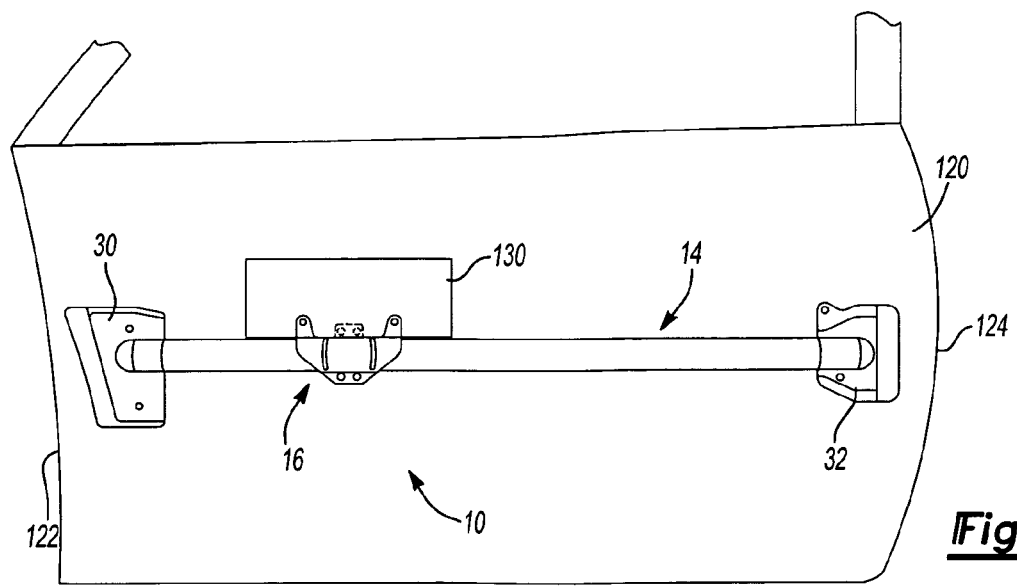
FIG. 7 illustrates a door of an automotive vehicle in accordance with an aspect of the present invention.

After transportation, the assembly 10 is attached to an article of manufacture, which, in FIG. 7, is illustrated as a door 120 of an automotive vehicle. Of course, as discussed, it is contemplated that the assembly 10 may be applied to various portions of an automotive vehicle and may also be attached to various articles of manufacture. As shown, the first end bracket 30 and the second end bracket 32 are attached (e.g. mechanically fastened or welded) to the door 120 adjacent opposite sides 122, 124 of the door 120.

Generally, it is contemplated that various alternatives or alterations to the initial cure, transportation and assembly steps may also be employed. For example, and particularly where transportation to the article of manufacture (e.g., automotive vehicle) is short, the process may be accomplished without an initial cure. Moreover, and particularly during transportation, it is contemplated that various different packing methods may be employed for moving the assemblies. For example, various different racks may support the assemblies or the assemblies may be loose-packed. The skilled artisan will be able to think of various additional packing methods, which may also be employed according to the present invention.

Also after transportation and, optionally, after assembly to the article of manufacture, the adhesive material 12 is further cured in a secondary cure operation to further secure the first member 14 to the second member 16. Like the initial cure, the secondary cure may be accomplished by exposure to heat, exposure to chemicals (e.g., cross-linking agents), exposure to moisture, exposure to light or radiation or other techniques. Preferably, the secondary cure occurs during a processing step that is traditional or non-additional for the article of manufacture to which the assembly 10 is attached.

In the preferred embodiment, the automotive vehicle along with its door 120 and the assembly 10 undergo an electrocoat (e-coat) process for applying a coating to the automotive vehicle and the assembly 10 and for further curing the adhesive material. During such an e-coat process, the assembly 10 along with the door 120 and the automotive vehicle are typically immersed in a pool of coating material. While in the coating material, the adhesive material 12 is exposed to an elevated temperature for a period of time, which causes the adhesive material to further cure and preferably substantially completely cure. Typical temperatures in an e-coat process and, thus, a typical temperature for the secondary cure is between about 200° F. and about 500° F. and more preferably between about 300° F. and about 400° F. Typical time periods for an e-coat process and, thus, a typical time period for the secondary cure are between about 15 minutes and about 45 minutes and more preferably between about 25 minutes and about 35 minutes.

Advantageously, since the e-coat is a step is a traditional or non-additional step in processing of the automotive vehicle processing, the secondary cure does not add any significant time to the processing of the automotive vehicle. As an added advantage, when the adhesive material 12 is conductive, the adhesive material 12 can assist the adhered members to accept the e-coat and the material 12 itself can be susceptible to adhesion of the e-coat coating.

According to the preferred embodiment as shown in FIG. 7, the second member 16 is employed for supporting a foam block 130. The foam block 130 is intended as an energy absorption mechanism in the event of a collision. It is contemplated, however, that the purposes of the first member 14, the second member 14 or both may be widely varied within the scope of the present invention.

Advantageously, the method of the present invention may be used to adhere members together wherein other attachment techniques (welding, employment of mechanical fasteners or the like) are undesirable. For example, the adhesion method may replace welding in situations that welding may be detrimental to one of the member being fastened together. Thus, according to one embodiment, the method of the present invention is employed to adhere members together without welding the members to each other.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming a reinforcement assembly, comprising:
   providing a first member having a first surface and a second member having a second surface wherein the first member is a door reinforcement beam for an automotive vehicle and the second member is a bracket composed of a first structure and a second structure;
   providing a structural adhesive material;
   positioning the structural adhesive material between the first surface and the second surface;
   welding the first structure to the second structure at flanges of the first structure and the second structure;
   at least partially curing the structural adhesive material such that the structural adhesive material at least partially adheres to the first surface and the second surface for forming an assembly; and
   transporting the assembly after the adhesive material adheres to the first and second surface.

2. A method as in claim 1, further comprising:
   assembling the assembly to an article of manufacture; and
   further curing the structural adhesive material to further secure the first surface to the second surface.

3. A method as in claim 2 wherein the article of manufacture is an automotive vehicle.

4. A method as in claim 3 wherein the step of assembling the assembly includes mounting the assembly within a door of an automotive vehicle.

5. A method as in claim 4 wherein the step of at least partially curing the adhesive material includes exposing the adhesive material to at least one of heat, pressure, radiation, microwaves, electricity or a combination thereof.

6. A method as in claim 5, further comprising:
   at least partially supporting a foam block with the second member.

7. A method as in claim 1 wherein the adhesive material is epoxy based.

8. A method as in claim 1 wherein the step of at least partially curing the adhesive material leaves the adhesive material between about 30% and about 97% cured.

9. A method as in claim 1 wherein the step of at least partially curing the adhesive material includes substantially fully curing the adhesive material.

10. A method of forming a reinforcement assembly for an automotive vehicle, comprising:
    providing a door beam having a first surface and a bracket having a second surface, the bracket including a first structure and a second structure;
    providing a structural adhesive material;
    positioning the structural adhesive material between the first surface and the second surface;
    welding the first structure to the second structure with the structural adhesive material between the first surface and the second surface;
    at least partially curing the structural adhesive material by exposing the adhesive material to heat such that the structural adhesive material at least partially adheres to the first surface and the second surface for forming an assembly;
    transporting the assembly after the adhesive material adheres to the first and second surface;
    assembling the assembly to a door of the automotive vehicle to form the assembly.

11. A method as in claim 10, further comprising:
    further curing the adhesive material by exposing the adhesive material to elevated temperatures in a painting or e-coat process.

12. A method as in claim 10 wherein the step of at least partially curing includes substantially fully curing the adhesive material.

13. A method as in claim 10 wherein the adhesive material is epoxy based.

14. A method as in claim 10, further comprising:
    at least partially supporting a foam block with the second member.

15. A method of forming a reinforcement assembly for an automotive vehicle, comprising:
    attaching an adhesive material to an attachment surface of a door beam or an attachment surface of a bracket;
    positioning the bracket and the door beam such that the adhesive material is at least partially between the attachment surface of the door beam and the attachment surface of the bracket wherein the step of positioning the adhesive material includes welding a first structure of the bracket to a second structure of the bracket;
    exposing the adhesive material to heat such that the adhesive material at least partially cures and adheres itself to the attachment surface of the door beam and the attachment surface of the bracket thereby forming an assembly; and
    assembling the assembly to an automotive vehicle.

16. A method as in claim 15 wherein the step of exposing the adhesive material to heat includes exposing for a time period that results in a partial cure.

17. A method as in claim 16 wherein the time period is between about 3 minutes and about 10 minutes.

18. A method as in claim 17 wherein the partial cure results in adhesive material being between about 30% and about 97% cured.

19. A method as in claim 18 further comprising
transporting the assembly prior to assembling the assembly to the automotive vehicle.

20. A method as in claim 19 further comprising:
substantially fully curing the adhesive material in a painting or e-coat process.

21. A method as in claim 20 wherein the step of substantially fully curing the adhesive material includes exposing for a time period that results in a full cure.

22. A method as in claim 15 wherein the adhesive material is epoxy based.

23. A method as in claim 15, further comprising:
at least partially supporting a foam block with the bracket.

24. A method as in claim 15 wherein the step of exposing the adhesive material to heat includes exposing the adhesive material to infrared radiation.

25. A method as in claim 15 wherein the step of exposing the adhesive material to heat includes placing the door beam, bracket and adhesive material within a heating structure.

26. A method as in claim 15 wherein the step of exposing the adhesive material to heat includes only locally exposing the material to heat without exposing a substantial portion of the door beam to heat.

* * * * *